United States Patent
Maddaleno et al.

(10) Patent No.: US 11,873,725 B2
(45) Date of Patent: Jan. 16, 2024

(54) FASTENER COVER FOR FLANGED JOINT

(71) Applicant: GE Avio S.r.l., Rivalta di Turin (IT)

(72) Inventors: Roberto Maddaleno, Lanzo Torinese (IT); Andrea Depalma, Rivoli (IT); Antonio Giuseppe D'Ettole, Rivoli (IT); Matteo Renato Usseglio, Turin (IT); Christian Campanale, Turin (IT)

(73) Assignee: GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 17/694,956

(22) Filed: Mar. 15, 2022

(65) Prior Publication Data
US 2022/0333503 A1     Oct. 20, 2022

(30) Foreign Application Priority Data
Apr. 16, 2021   (IT) .................. 102021000009716

(51) Int. Cl.
  *F01D 25/24*   (2006.01)
  *F01D 25/30*   (2006.01)

(52) U.S. Cl.
  CPC .......... *F01D 25/243* (2013.01); *F01D 25/30* (2013.01); *F05D 2240/70* (2013.01); *F05D 2260/31* (2013.01)

(58) Field of Classification Search
  CPC ...... F01D 25/24; F01D 25/246; F01D 25/243; F01D 5/027; F05D 2240/15; F05D 2260/31
  See application file for complete search history.

(56) References Cited

U.S. PATENT DOCUMENTS

| | | | |
|---|---|---|---|
| 3,727,660 | A | 4/1973 | Burge |
| 4,190,397 | A | 2/1980 | Schilling et al. |
| 4,245,959 | A | 1/1981 | Carreno |
| 4,883,407 | A | 11/1989 | Touze |

(Continued)

FOREIGN PATENT DOCUMENTS

| | | |
|---|---|---|
| EP | 1637703 A1 | 3/2006 |
| EP | 1930552 A2 | 6/2008 |

(Continued)

OTHER PUBLICATIONS

Italian Search Report for IT Application No. 102021000009716 dated Apr. 16, 2021 (11 pages).

*Primary Examiner* — David E Sosnowski
*Assistant Examiner* — Maxime M Adjagbe
(74) *Attorney, Agent, or Firm* — Dinsmore & Shohl LLP

(57) ABSTRACT

A fastener cover for a flanged joint including first and second annular flanges extending about an axis, comprising: an annular, axially-extending, inboard wall; an annular, axially-extending outboard wall positioned radially outboard of the inboard wall; and a first radial wall interconnecting the inboard and outboard walls, wherein, collectively, the inboard and outboard walls and the first radial wall define a cavity for receiving a portion of a fastener; at least one fastener pocket including sidewalls extending axially away from the first radial wall and defining a tubular shape, which is closed off opposite the first radial wall by a floor plate having a clearance hole passing therethrough for accepting a shank of the fastener; and wherein the cover includes a balance weight receptacle for accepting at least one balance weight.

17 Claims, 11 Drawing Sheets

(56) References Cited

U.S. PATENT DOCUMENTS

| | | | |
|---|---|---|---|
| 5,090,865 A | 2/1992 | Ramachandran et al. | |
| 5,257,905 A | 11/1993 | Wynn et al. | |
| 5,259,725 A | 11/1993 | Hemmelgarn et al. | |
| 5,363,643 A | 11/1994 | Halila | |
| 5,522,698 A | 6/1996 | Butler et al. | |
| 5,713,522 A | 2/1998 | Lundberg | |
| 6,761,034 B2 | 7/2004 | Niday et al. | |
| 7,094,020 B2 | 8/2006 | Dong et al. | |
| 7,249,463 B2 | 7/2007 | Anderson et al. | |
| 7,303,377 B2 * | 12/2007 | Rockarts | F02K 3/04 416/144 |
| 7,367,766 B2 | 5/2008 | Dao et al. | |
| 7,614,845 B2 * | 11/2009 | Adam | F01D 25/145 415/173.1 |
| 7,704,038 B2 * | 4/2010 | Ring | F01D 25/246 415/214.1 |
| 8,240,043 B2 | 8/2012 | Duesler et al. | |
| 8,459,941 B2 * | 6/2013 | Jasko | F01D 9/041 285/129.1 |
| 8,556,561 B2 * | 10/2013 | Norton | F04D 29/644 411/548 |
| 8,727,719 B2 | 5/2014 | Belmonte et al. | |
| 10,704,416 B2 | 7/2020 | Ha et al. | |
| 2006/0053768 A1 | 3/2006 | Anderson et al. | |
| 2006/0193721 A1 | 8/2006 | Adam et al. | |
| 2009/0297335 A1 | 12/2009 | Karafillis et al. | |
| 2013/0251446 A1 | 9/2013 | Bird et al. | |
| 2014/0140828 A1 | 5/2014 | Rioux | |
| 2017/0108009 A1 | 4/2017 | Obereich | |
| 2020/0003078 A1 * | 1/2020 | Wuestenberg | F16H 57/08 |

FOREIGN PATENT DOCUMENTS

| | | |
|---|---|---|
| EP | 3088690 A1 | 11/2016 |
| WO | 2015157751 A1 | 10/2015 |

* cited by examiner

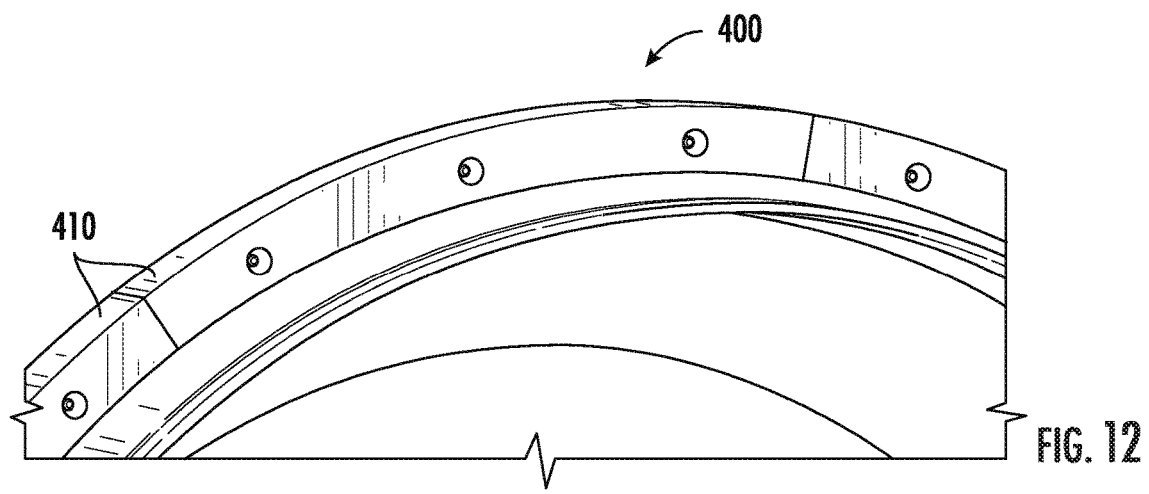
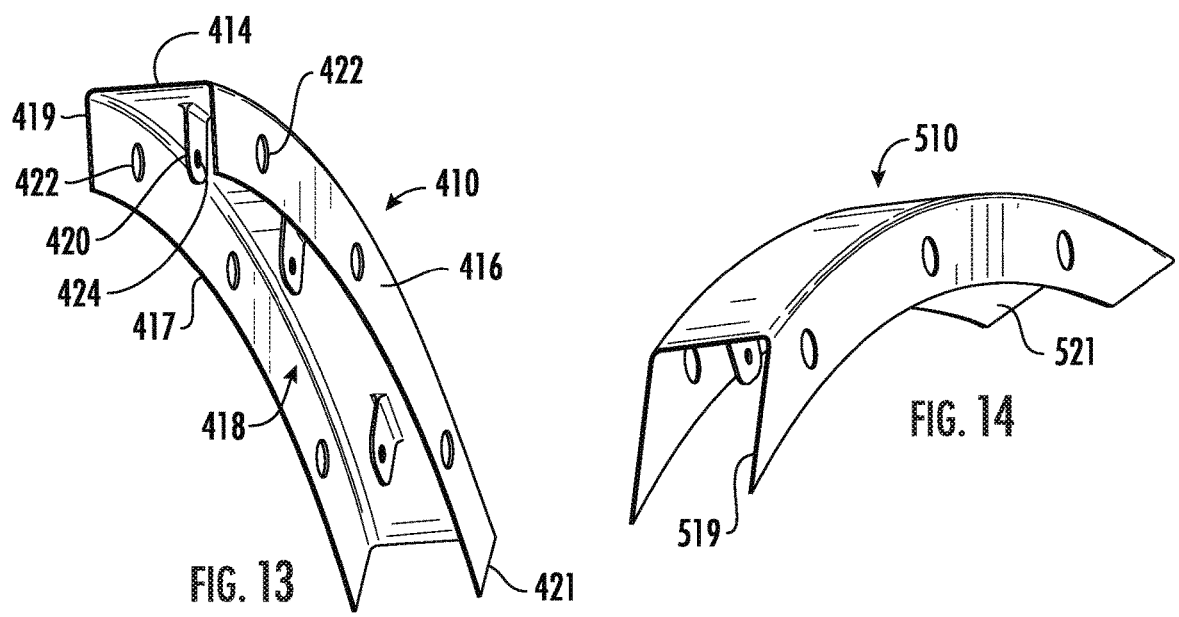
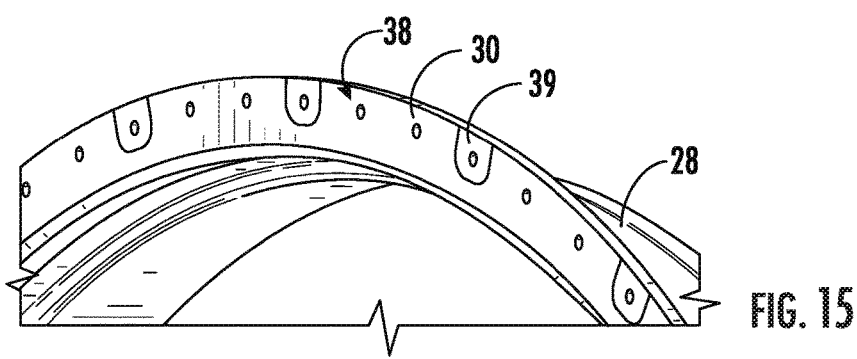

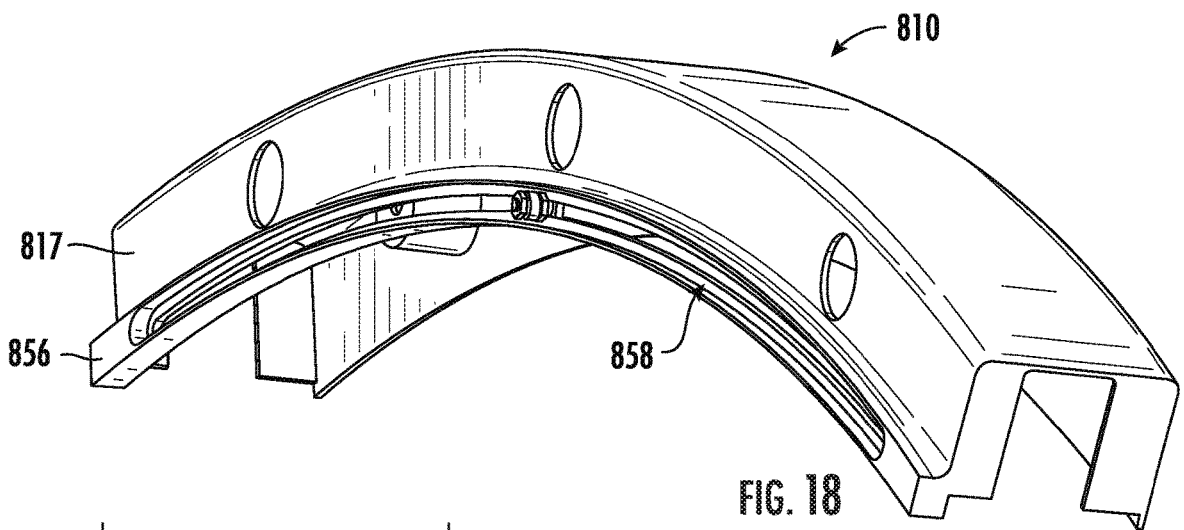
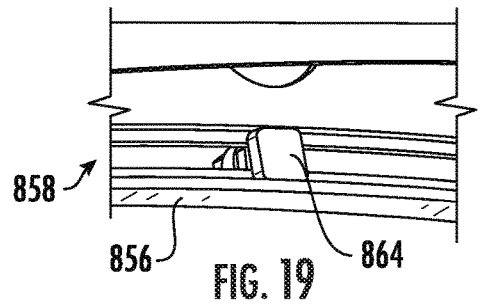
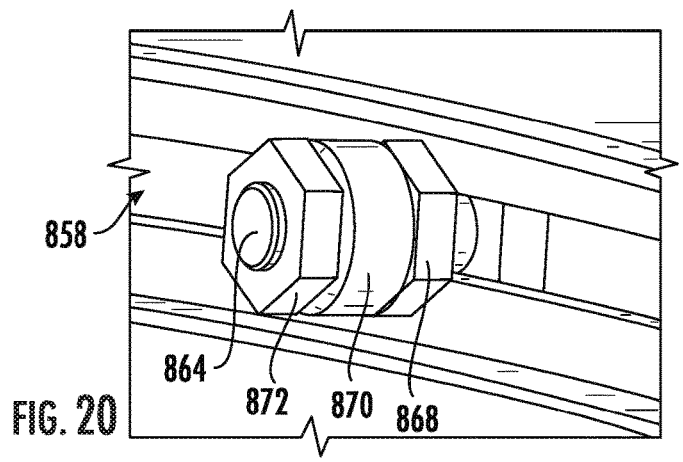
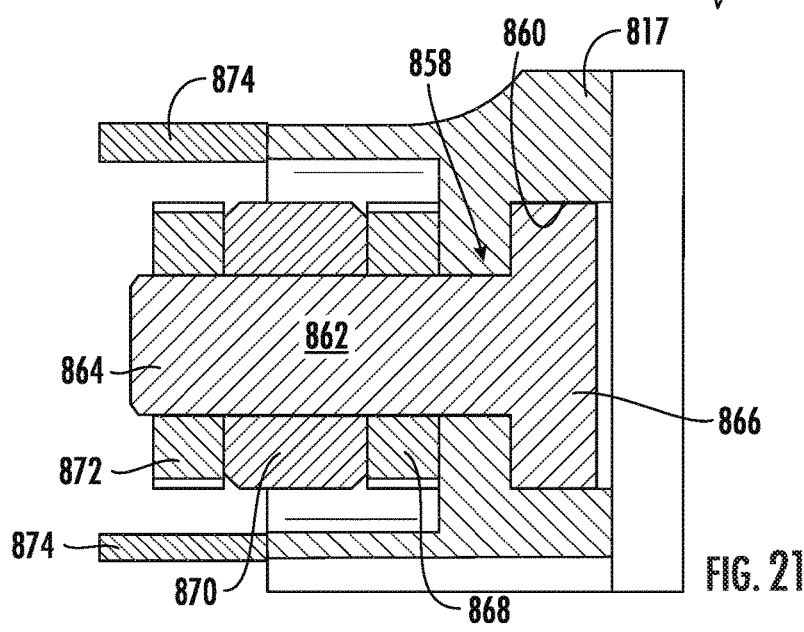

FASTENER COVER FOR FLANGED JOINT

CROSS-REFERENCE TO RELATED APPLICATION

This application claims the benefit of priority under 35 U.S.C. § 119(a) of Italian Patent Application No. 102021000009716 filed on Apr. 16, 2021, the entire disclosure of which is incorporated herein by reference.

CONTRACT STATEMENT

The project leading to this application has received funding from the Clean Sky 2 Joint Undertaking under the European Union's Horizon 2020 research and innovation program under grant agreement No. CS2-LPA-GAM-2018/2019-01.

BACKGROUND OF THE INVENTION

The present invention relates generally to gas turbine engines, and more particularly to flanged joints in such engines.

A gas turbine engine typically includes, in serial flow communication, a low-pressure compressor or booster, a high-pressure compressor, a combustor, a high-pressure turbine, and a low-pressure turbine. The combustor generates combustion gases that are channeled in succession to the high-pressure turbine where they are expanded to drive the high-pressure turbine, and then to the low-pressure turbine where they are further expanded to drive the low-pressure turbine. The high-pressure turbine is drivingly connected to the high-pressure compressor via a first rotor shaft, and the low-pressure turbine is drivingly connected to the booster via a second rotor shaft.

The engine includes multiple annular structures such as stationary casings and rotating shafts or drums. These annular structures frequently include two or more portions which are joined to each other at flanged joints, in which two flanges are clamped together by a ring of bolts.

In operation, interaction of air flow with the exposed portions of the bolts in a flanged joint produces undesirable results such as aerodynamic drag and frictional heating. Accordingly, it is known in the prior art to provide arcuate covers over the bolts, referred to as "windage shields".

BRIEF DESCRIPTION OF THE INVENTION

The present invention provides a fastener cover which provides a windage shielding function and may include balancing features, sealing features, or damping features.

According to one aspect of the technology described herein, a fastener cover is described for a flanged joint including first and second annular flanges extending about an axis, the fastener cover including: an annular, axially-extending, inboard wall; an annular, axially-extending outboard wall positioned radially outboard of the inboard wall; and a first radial wall interconnecting the inboard and outboard walls, wherein, collectively, the inboard and outboard walls and the first radial wall define a cavity for receiving a portion of a fastener; at least one fastener pocket including sidewalls extending axially away from the first radial wall and defining a tubular shape, which is closed off opposite the first radial wall by a floor plate having a clearance hole passing therethrough for accepting a shank of the fastener; and wherein the cover includes a balance weight receptacle for accepting at least one balance weight.

According to another aspect of the technology described herein, a fastener cover is described for a flanged joint including first and second annular flanges extending about an axis, the fastener cover including: a plurality of arcuate fastener cover segments arrayed about the axis to form a 360 degree annulus, each fastener cover segment extending between first and second circumferential ends and including: a first radial wall, a second radial wall axially spaced-apart from the first radial wall, an arcuate, axially-extending outboard wall interconnecting the first and second radial walls, wherein, collectively, the first and second radial walls and the outboard wall define a cavity for receiving the first and second flanges and portions of fasteners which protrude from the flanges; and an attachment structure spaced away from the first radial wall and including a clearance hole for a fastener shank.

BRIEF DESCRIPTION OF THE DRAWINGS

The invention may be best understood by reference to the following description taken in conjunction with the accompanying drawing figures in which:

FIG. 12 is a perspective view of a portion of a rotor having a flanged joint, showing a third exemplary embodiment of a fastener cover attached thereto;

FIG. 13 is a perspective view of the fastener cover of FIG. 12;

FIG. 14 is a perspective view of an alternative variation of the fastener cover of FIG. 12;

FIG. 15 is a perspective view a shaft of FIG. 12, showing a mating surface thereof;

FIG. 18 is a perspective view of an exemplary fastener cover segment including a balance weight;

FIG. 19 is an enlarged view of a portion of the fastener cover segment of FIG. 18;

FIG. 20 is an enlarged view of a portion of the fastener cover segment of FIG. 18;

FIG. 21 is a cross-sectional view of a portion of the fastener cover segment of FIG. 18;

DETAILED DESCRIPTION OF THE INVENTION

Figure 1:
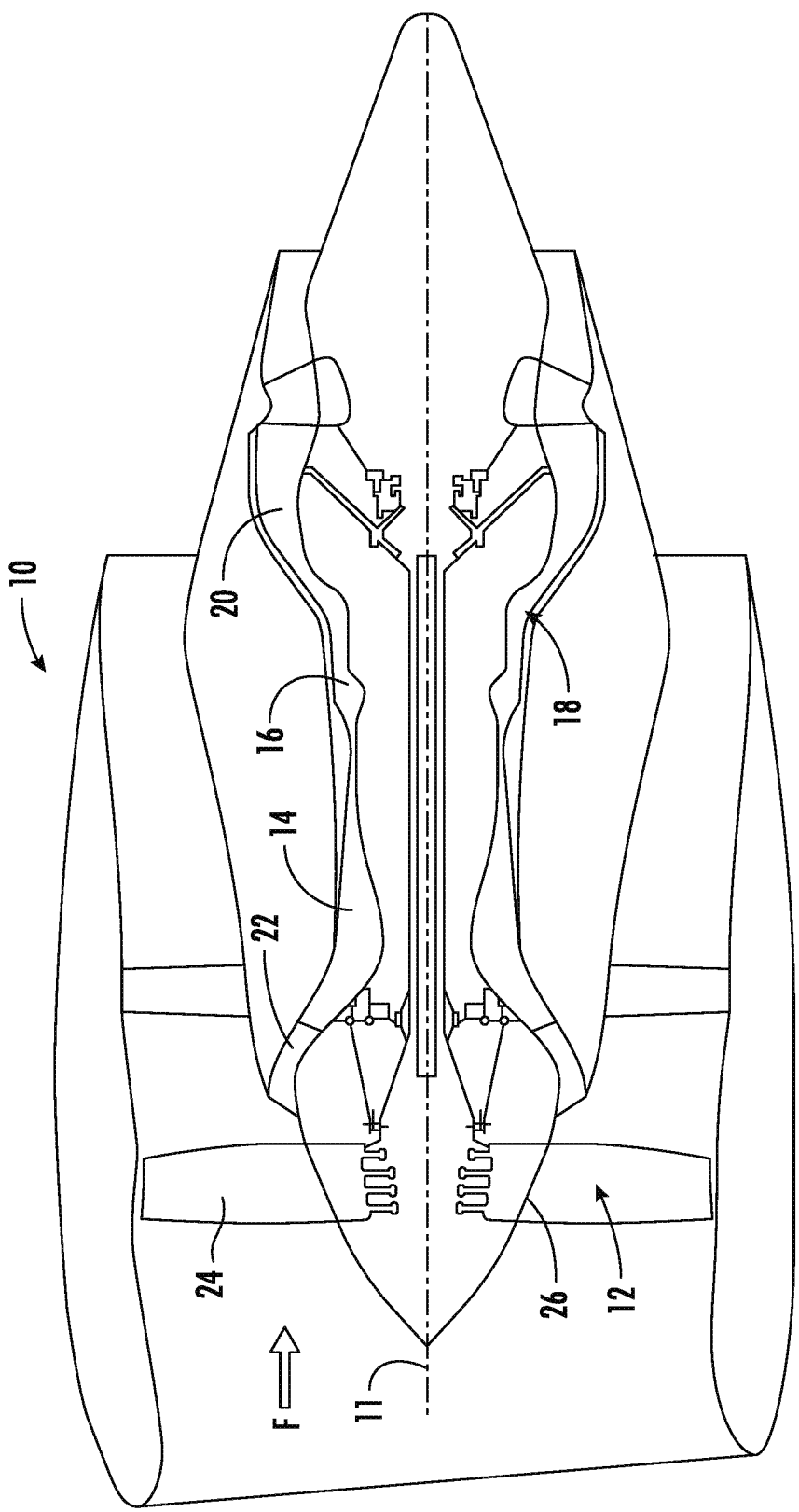
FIG. 1 is a schematic illustration of a prior art gas turbine engine.

Referring to the drawings wherein identical reference numerals denote the same elements throughout the various views, FIG. 1 is a schematic illustration of a gas turbine engine 10 having a centerline or longitudinal axis 11 and including a fan assembly 12, a high-pressure compressor 14, and a combustor 16. The engine 10 also includes a high-pressure turbine 18, a low-pressure turbine 20, and a booster 22. Fan assembly 12 includes an array of fan blades 24 extending radially outward from a rotor disk 26. While the illustrated engine 10 is a turbofan engine, the principles described herein are applicable to any type of engine or machine having flanged joints between components.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

In operation, air flows through low pressure compressor 22 and compressed air is supplied from low pressure compressor 22 to high pressure compressor 14. The highly compressed air is delivered to combustor 16 where fuel is injected and burned. Airflow from the combustor 16 drives the turbines 18 and 20 and exits the engine 10 through a nozzle. The high-pressure turbine 18 drives the high-pressure compressor 14 through a high-pressure shaft, and the low-pressure turbine 20 drives the fan assembly 12 and booster 22 through a low-pressure shaft.

It will be understood that the engine 10 includes therein one or more flanged joints comprising two annular components each having flanges which abut each other and which are clamped together by a plurality of fasteners. Nonlimiting examples of flanged joints may be found in casings, shafts, or rotors.

Figure 2:
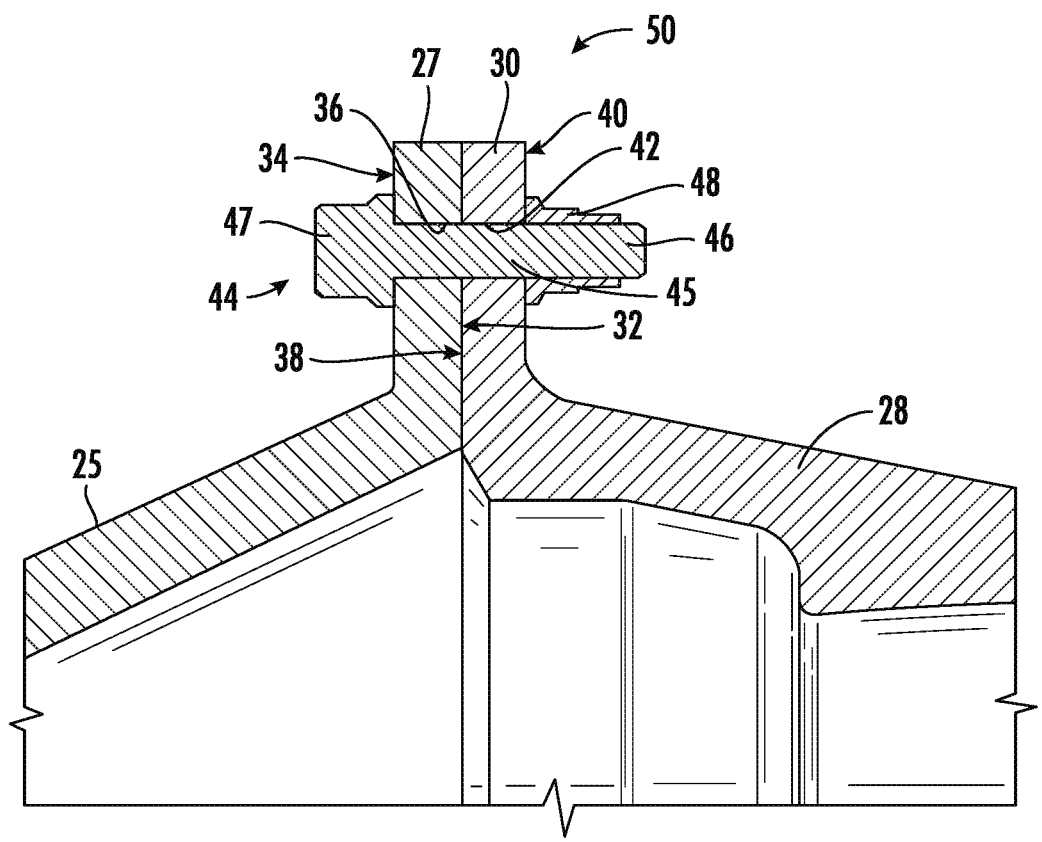
FIG. 2 is a sectional view of a prior art rotor having a flanged joint.
Figure 3:
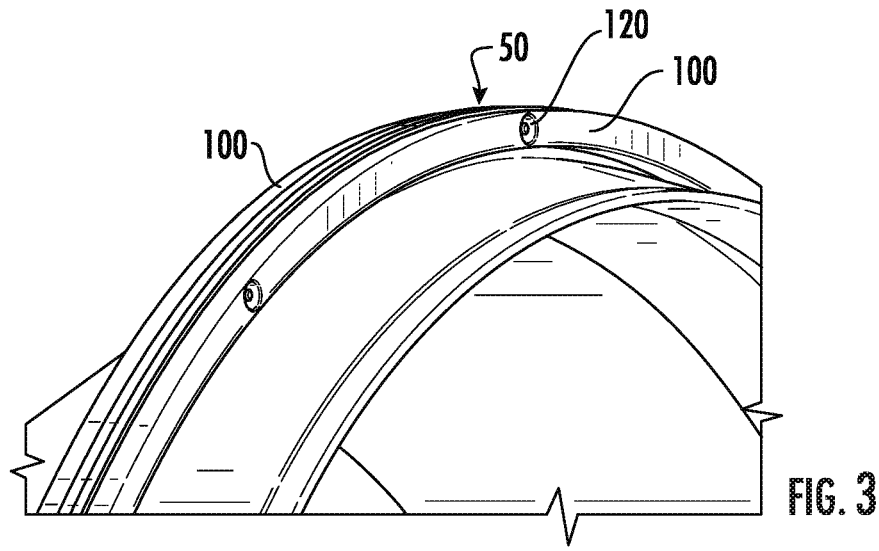
FIG. 3 is a perspective view of a portion of a rotor having a flanged joint, showing a first exemplary embodiment of a fastener cover attached thereto.
Figure 4:
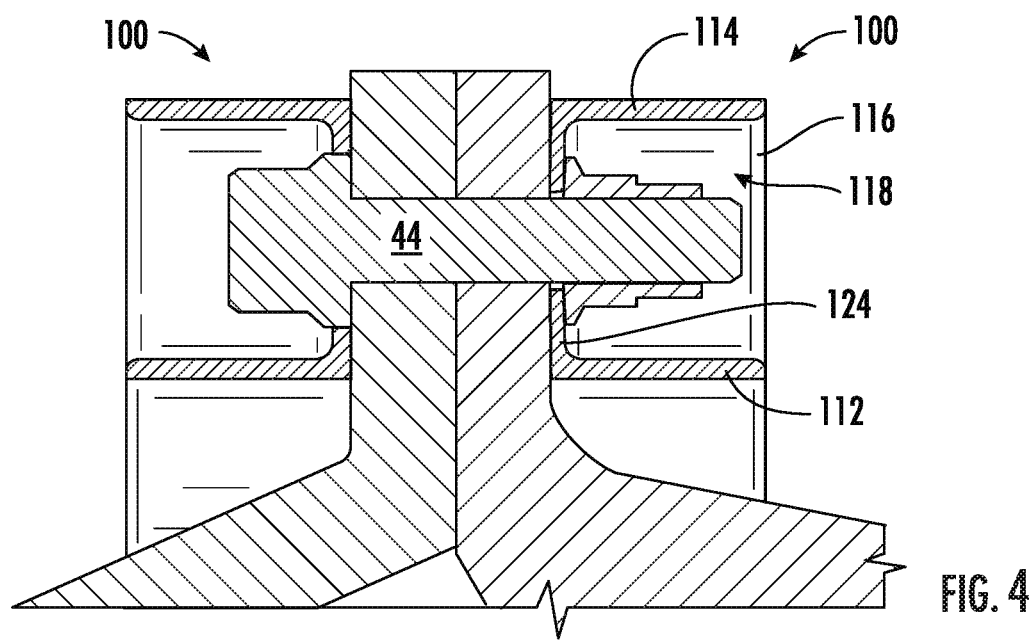
FIG. 4 is a partial cross-sectional view of the fastener cover of FIG. 3.

FIG. 2 shows a rotor assembly comprising a first shaft 25 having an annular first flange 27 and a second shaft 28 having an annular second flange 30. The assembly is merely a representative example to demonstrate the structure of a flanged joint. The rotor assembly or a similar structure may be found in various areas within the engine 10 of FIG. 1, such as in a shaft interconnecting one of the turbines with one of the compressor or propulsive elements, e.g. a low-pressure shaft, an intermediate pressure shaft, or a high-pressure shaft (not separately labeled in FIG. 1).

The first flange 27 includes an axially-facing first mating surface 32 and an opposed first back surface 34. A plurality of axially-aligned first fastener holes 36 extend through the first flange 27. The second flange 30 includes an axially-facing second mating surface 38 and an opposed second back surface 40. A plurality of axially-aligned second fastener holes 42 extend through the second flange 30.

The first and second flanges 27, 30 are disposed such that they abut each other and each of the first fastener holes 36 is coaxial to a corresponding one of the second fastener holes 42.

A fastener 44 having a shank 46 is inserted through each of the coaxial pairs of the first fastener holes 36 and second fastener holes 42 and is secured. The fastener 44 is illustrated as a bolt 45 with a head 47, in combination with a nut 48. It will be understood that other types of fasteners may be used for this purpose. When torqued, the fasteners 44 clamp together the first and second flanges 27, 30, coupling the first and second shafts 25, 28 together and permitting torque transfer therebetween. Collectively, the first flange 27, the second flange 30, and the fasteners 44 may be referred to as a "flanged joint" 50.

The present invention describes various embodiment of windage shields that can perform functions in addition to windage shielding, including for example balancing features, sealing features, or damping features.

FIGS. 3-6 illustrate a first exemplary embodiment of a fastener cover 100 suitable for use with the flanged joint 50 of FIG. 2. Two fastener covers 100 are provided, one for the first flange 27 and one for the second flange 30. These may be identical to each other in all important aspects; accordingly, only one of them is described in detail.

In this example, the fastener cover 100 is a 360° annulus and includes arcuate, axially-extending, radially-spaced-apart inboard and outboard walls 112, 114 respectively. The inboard and outboard walls 112, 114 are interconnected by a first radial wall 116. Collectively, the inboard and outboard walls 112, 114 and the first radial wall 116 define a cavity 118 (FIG. 6) which is shaped and sized so as to accommodate a portion of the fastener 44 which protrudes from the second back surface 40 of the second flange 30.

Figure 5:
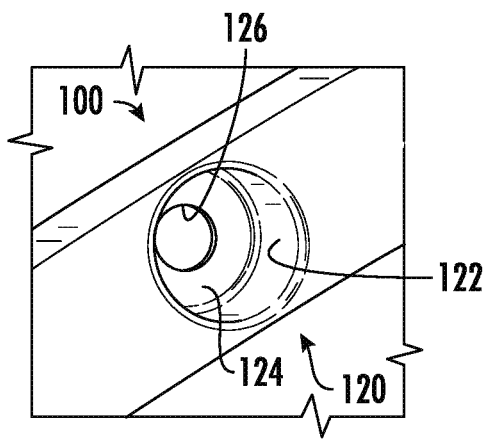
FIG. 5 is a front perspective view of a portion of the fastener cover of FIG. 3.
Figure 6:
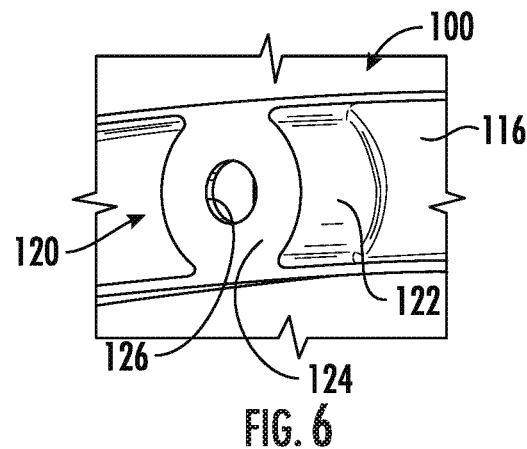
FIG. 6 is a rear perspective view of the fastener cover of FIG. 5.

Fastener pockets 120 are formed at predetermined locations around the circumference of the fastener cover 100. These are best seen in FIGS. 5 and 6. Each fastener pocket 120 includes sidewalls 122 extending an axial direction, away from the first radial wall 116, defining a short tubular shape, which is closed off opposite the first radial wall 116 by a floor plate 124. A clearance hole 126 passes through the floor plate 124 and is sized to accept the shank 46 of the fastener 44. The fastener pockets 120 are one example of an "attachment structure".

When assembled, the floor plates 124 of the fastener cover 100 abut the second back surface 40 of the second flange 30. The fastener cover 100 is clamped into place by a portion of the fastener 44 (e.g. the nut 48 or the head 47 of the bolt 45). Thus assembled, the fastener cover 100 provides smooth, generally continuous surfaces facing in the radial and axial directions, interrupted only by the fastener pockets 120 which provide access for a tool, such as a socket wrench, used to install or remove the fasteners 44.

Figure 7:
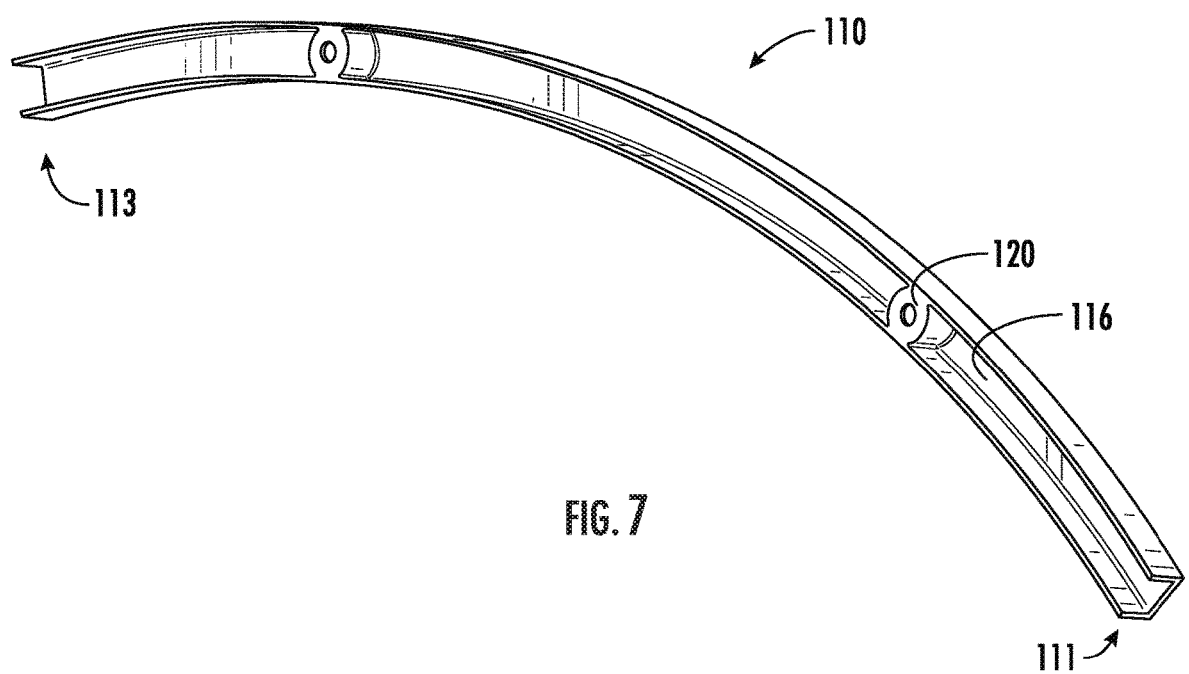
FIG. 7 is a perspective view of a fastener cover segment.
Figure 8:
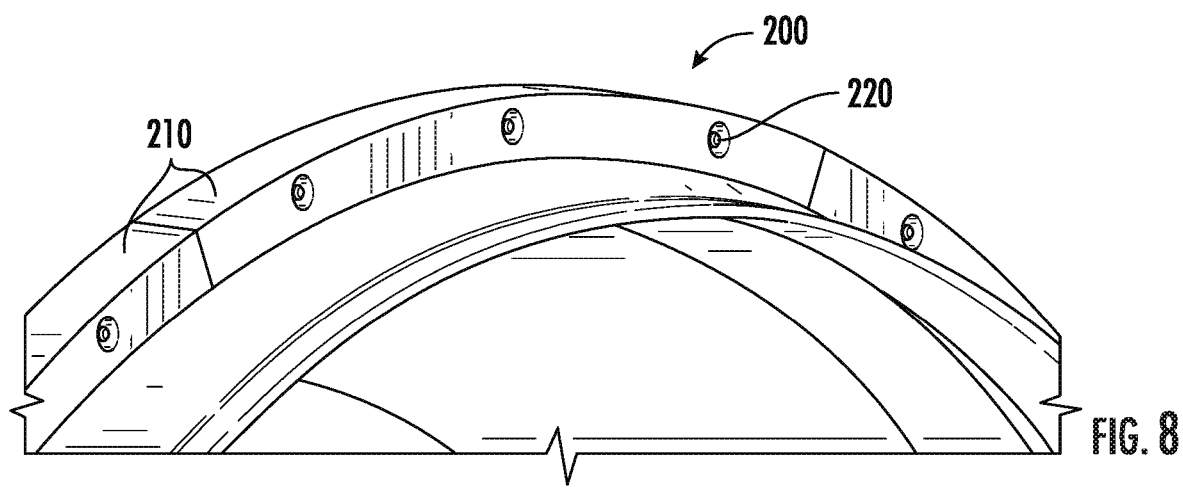
FIG. 8 is a perspective view of a portion of a rotor having a flanged joint, showing a second exemplary embodiment of a fastener cover attached thereto.

In one variation, the fastener cover 100 may be segmented instead of circumferentially continuous. FIG. 7 illustrates an arcuate fastener cover segment 110. The structure of the fastener cover segment 110 is substantially identical to that of the fastener cover 100 described above, except that the fastener cover segment 110 extends from a first circumferential end 111 to a second circumferential end 113 and the circumferential distance between the ends 111, 113 is less than 360°. It will be understood that a plurality of such fastener cover segments 110 would be attached to the first flange 27 or the second flange 30 to form a complete 360° annulus.

FIGS. 8-11 illustrate a second exemplary embodiment of a fastener cover 200 suitable for use with the flanged joint 50 of FIG. 2. A single fastener cover 200 is provided, which covers both the first flange 27 and the second flange 30.

The fastener cover 200 comprises a plurality of arcuate fastener cover segments 210. A plurality of such fastener cover segments 210 would be attached to the first flange 27 and the second flange 30 to form a complete 360° annulus. The fastener cover segments 210 may be identical to each other in all important aspects; accordingly, only one of them is described in detail.

In this example, the fastener cover segment 210 includes a first radial wall 216 and a second radial wall 217 spaced-apart from the first radial wall 216. An arcuate, axially-extending outboard wall 214 interconnects the first and second radial walls 216, 217. Collectively, the first and second radial walls 216, 217 and the outboard wall 214 define a cavity 218 which is shaped and sized so as to accommodate the first and second flanges 27, 30 and the portions of the fasteners 44 which protrude from the back surfaces 34, 40 of the flanges 27, 30.

Figure 9:
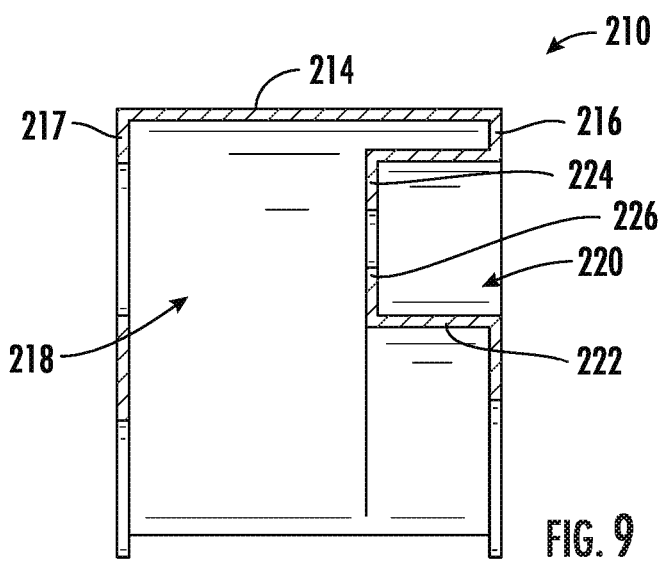
FIG. 9 is a partial cross-sectional view of the fastener cover of FIG. 8.

Fastener pockets 220 are formed at predetermined locations around the circumference of the fastener cover segment 210. These are best seen in FIG. 9. Each fastener pocket includes sidewalls 222 extending axially from the first radial wall 216, defining a short tubular shape, which is closed off by a floor plate 224. A clearance hole 226 passes through the floor plate 224 and is sized to accept the shank 46 of the fastener 44.

When assembled, the floor plates 224 of the fastener cover segments 210 abut the second back surface 40 of the second flange 30. The fastener cover segments 210 are clamped into place by a portion of the fasteners 44 (e.g. the nut 48 or the head 47 of the bolt 45). Thus assembled, the fastener cover 200 provides smooth, generally continuous surfaces facing in the radial and axial directions, interrupted only by the fastener pockets 220 which provide access for a tool, such as a socket wrench, used to install or remove the fasteners 44.

Figure 10:
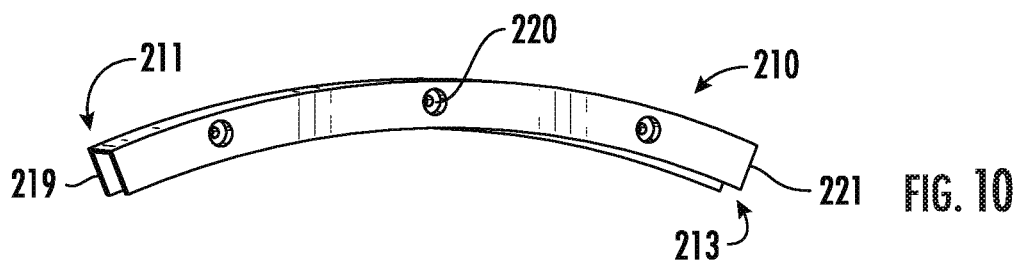
FIG. 10 is a perspective view of the fastener cover of FIG. 8.
Figure 11:
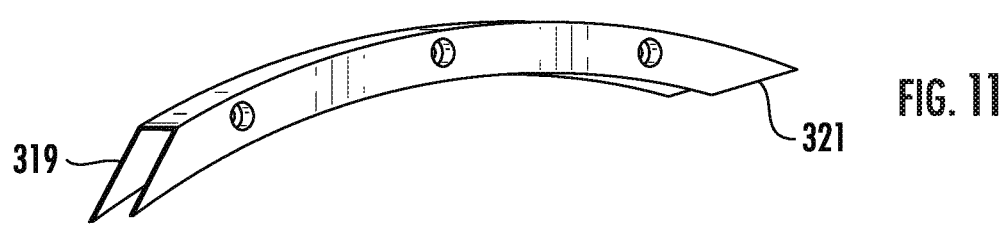
FIG. 11 is a perspective view of an alternative variation of the fastener cover of FIG. 8.

In the circumferential direction, the first and second radial walls 216, 217 extend between first and second circumferential ends 211, 213. Located at these ends are end edges 219, 221. The end edges 219, 221 may be oriented in a radial direction, as shown in FIG. 10. This orientation makes for simple installation or removal of the fastener cover segment 210, because it does not interfere with adjacent fastener cover segments 210. FIG. 11 shows an alternate fastener cover segment 310 having first and second end edges 319, 321 oriented along a direction oblique to the radial direction. This orientation requires that the entire ring of fastener cover segments 310 be installed or removed simultaneously.

FIGS. 12-15 illustrate a third exemplary embodiment of a fastener cover 400 suitable for use with the flanged joint 50 of FIG. 2. A single fastener cover 400 is provided, which covers both the first flange 27 and the second flange 30.

The fastener cover 400 comprises a plurality of arcuate fastener cover segments 410. A plurality of such fastener cover segments 410 would be attached to the first flange 27 and the second flange 30 to form a complete 360° annulus. The fastener cover segments 410 may be identical to each other in all important aspects; accordingly, only one of them is described in detail.

In this example, the fastener cover segment 410 includes a first radial wall 416 and a second radial wall 417 spaced-apart from the first radial wall 416. An arcuate, axially-extending outboard wall 414 interconnects the first and second radial walls 416, 417. Collectively, the first and second radial walls 416, 417 and the outboard wall 414 define a cavity 418 which is shaped and sized so as to accommodate the first and second flanges 27, 30 and the portions of the fasteners 44 which protrude from the back surfaces 34, 40 of the flanges 27, 30. An array of access holes 422 pass through the first and second radial walls 416, 417.

Mounting tabs 420 extend radially inward from the outboard wall 414 at predetermined locations around the circumference of the fastener cover segment 410. These are best seen in FIG. 13. Each mounting tab 420 includes a clearance hole 424 sized to accept the shank 46 of the fastener 44. The mounting tabs are one example of an "attachment structure".

When assembled, the mounting tabs 420 of the fastener cover segment 410 abut the second mating surface 38 of the second flange 30. In order to accommodate the thickness of the mounting tabs, recesses 39 (FIG. 15) may be formed in the mating surface 38 of the second flange 30. The fastener cover segment 410 is clamped into place between the first and second flanges 27 and 30, and the shank 46 of the fastener 44 passes through the mutually-aligned holes of the first flange 27, mounting tab 420, and second flange 30. Thus assembled, the fastener cover 400 provides smooth, generally continuous surfaces facing in the radial and axial directions, interrupted only by the access holes 422 which provide access for tools such as a socket wrench used to install or remove the fasteners 44.

In the circumferential direction, the first and second radial walls 416, 417 extend between first and second end edges 419, 421. The end edges 419, 421 may be oriented in a radial direction, as shown in FIG. 13. This orientation makes for simple installation or removal of the fastener cover segment 410, because it does not interfere with adjacent fastener cover segments 410. FIG. 14 shows an alternate fastener cover segment 510 having first and second end edges 519, 521 oriented along a direction oblique to the radial direction. This orientation requires that the entire ring of fastener cover segments 510 be installed or removed simultaneously.

In addition to their function of reducing windage losses around the fasteners, any of the fastener covers described above may incorporate additional structural features to perform additional functions.

Figure 16:
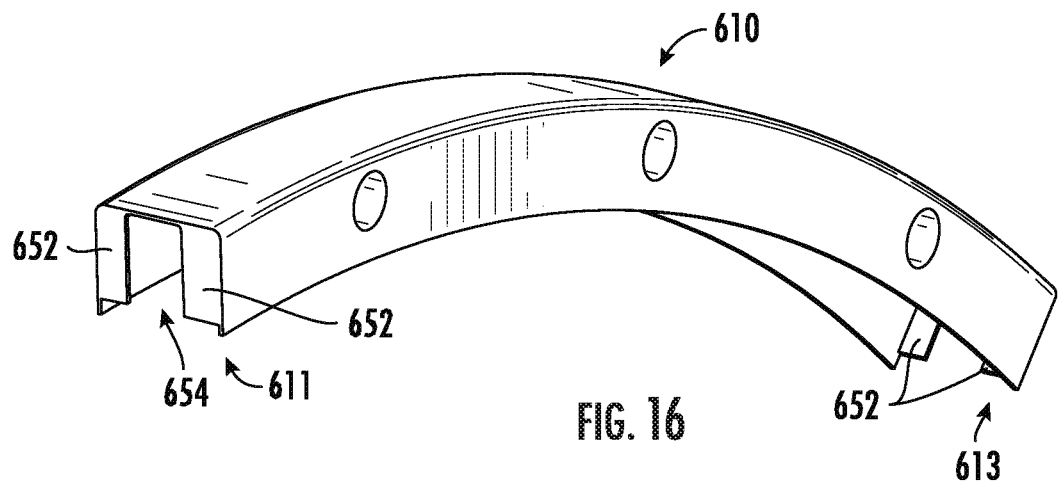
FIG. 16 is a perspective view of an exemplary fastener cover segment having radially-aligned end walls.

One possible additional function is frictional damping. To provide this function, any of the segmented embodiments of the fastener covers described above may be provided with end plates. FIG. 16 illustrates a fastener cover segment 610, similar to fastener cover segment 110, 210, or 410 described above and extending between first and second circumferential ends 611, 613. At the first circumferential end 611, a pair of end walls 652 extend in the axial direction from the first and second radial walls, and have a slot 654 therebetween to accommodate the passage of the first and second flanges 27, 30 (not shown in FIG. 16). A similar pair of end walls 652 are disposed at the second circumferential end 613. In this example, the end walls 652 are oriented parallel to the radial direction.

In operation, the first and second flanges 27, 30 are inherently subject to vibration and take up various mode shapes in which different tangential positions of the flanged joint 50 are deflected with different dynamic displacements. Stated another way, the first and second flanges 27, 30 can exhibit a "wavy" mode shape.

The fastener cover segments 610 incorporating the end walls 652 can provide frictional damping. More specifically, when installed, the end walls 652 of one fastener cover segment 610 abut the end walls 652 of the adjacent fastener cover segment 610. Any relative movements of adjacent fastener covers result in rubbing of the abutting end walls 652, thus dissipating some of the vibration.

In order to enhance the degree of frictional damping, the end walls 652 may be provided with a predetermined surface roughness, such as protruding or recessed surface features such as ribs or grooves (not shown). Alternatively, in order to enhance the degree of frictional damping, the end walls 652 may be provided with a coating or surface treatment that increases friction, such as a coating embedded with grit particles, or an elastomeric coating.

Figure 17:
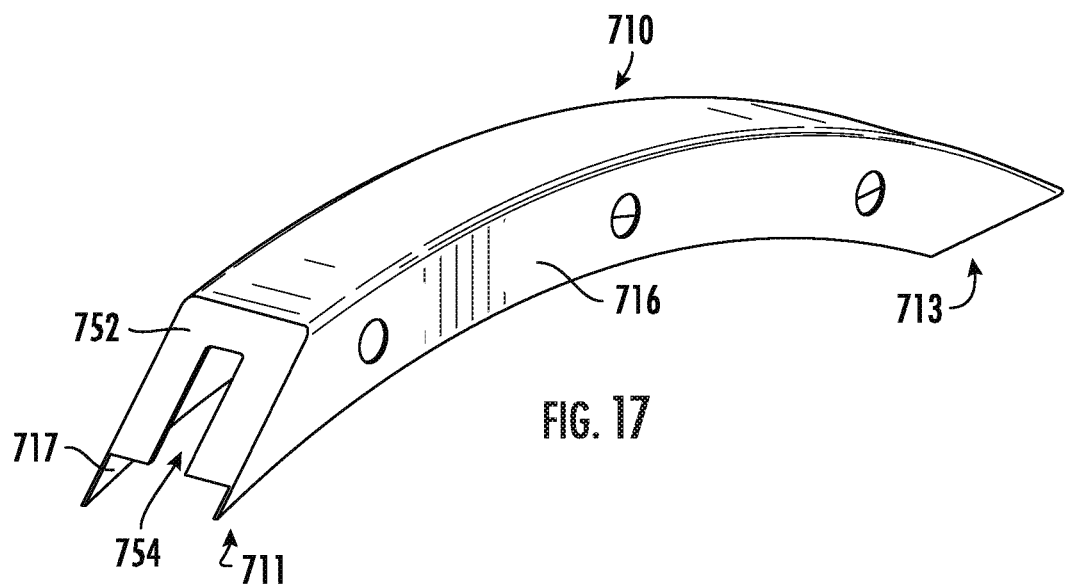
FIG. 17 is a perspective view of an exemplary fastener cover segment having obliquely-aligned end walls.

FIG. 17 illustrates a fastener cover segment 710 similar to the fastener cover segments 310 or 510 described above and including an end wall 752 at first circumferential end 711. The end wall 752 extends in the axial direction from the first and second radial walls 716, 717 and includes a slot 754 therein to accommodate the passage of the first and second flanges 27, 30 (not shown in FIG. 17). A similar end wall 752 is disposed at the second circumferential end 713. In this example, the end walls 752 are oriented oblique to the radial direction. Their function with the purpose of frictional damping is substantially the same as the end walls 652 described above. Additionally, an oblique surface will increase the damping effect due to the increase of damping area (i.e. the damping area is bigger compared to the radially-oriented surface).

Another possible additional function is the provision for mounting one or more balance weights for the purpose of adjusting the balance of the flanged joint 50.

One configuration for mounting one or more balance weights is shown in FIGS. 18-21. A fastener cover segment 810, most similar to fastener cover segments 210 or 410 described above, but representative of any of the fastener cover embodiments previously described, is provided with an arcuate rib 856 extending axially from the second radial wall 817. An arcuate slot 858 is formed through the axial thickness of the rib 856. A rebate 860 is formed in one portion of the slot 858. A narrow portion of the slot 858 receives a threaded shank 862 of a T-bolt 864. A head 866 of the T-bolt 864 is received in the rebate 860 and interfaces with the rebate 860 so as to prevent rotation of the T-bolt 864.

A locking nut 868 is threaded onto the shank 862 of the T-bolt 864. The locking nut 868 may be loosened to permit sliding of the T-bolt 864 to any desired location within the slot 858, and then tightened to clamp the T-bolt 864 in position. Optionally, one or more balance weights 870 may be placed over the shank 862 of the T-bolt 864, and then secured with a retention nut 872. This arrangement permits a predetermined mass to be positioned at a desired location so as to adjust the balance of the flanged joint 50. Optionally, the rib 856 may be provided with extended flanges 874 covering some or all of the balance weights 870 to reduce windage losses. The slot 858 is one example of a "balance weight receptacle".

Figure 22:
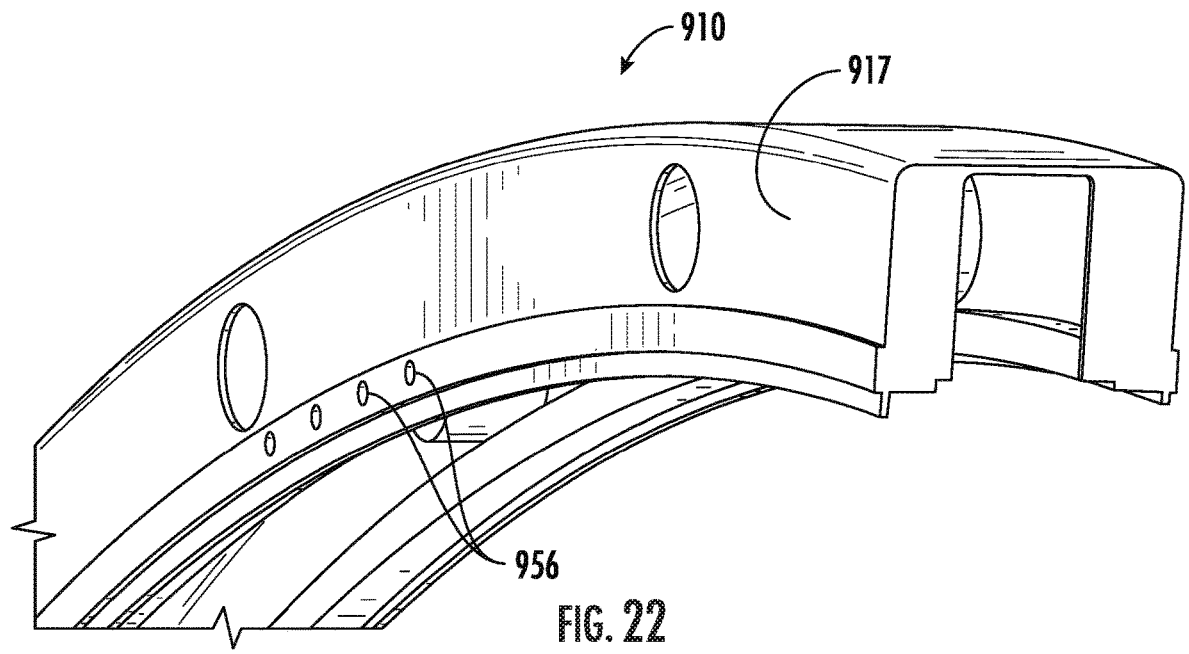
FIG. 22 is a perspective view of an exemplary fastener cover segment including an array of holes for receiving balance weights.
Figure 23:
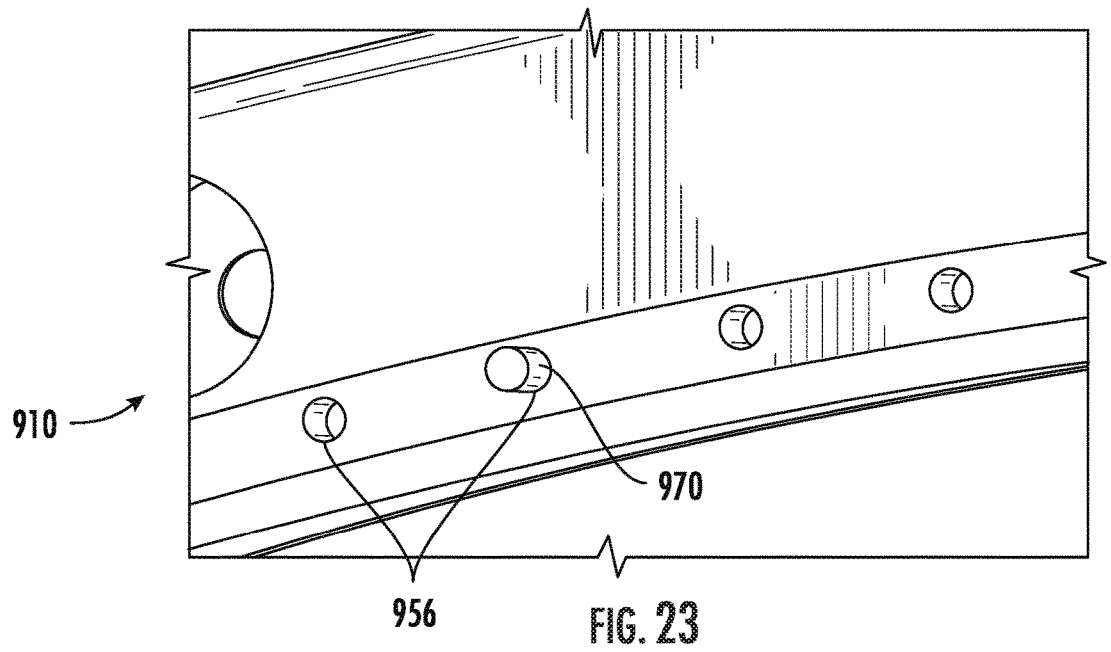
FIG. 23 is an enlarged view of a portion of the fastener cover segment of FIG. 22.

Another configuration for mounting one or more balance weights is shown in FIGS. 22 and 23. A fastener cover segment 910, most similar to fastener cover segments 210 or 410 described above, but representative of any of the fastener cover embodiments previously described, is provided with an array of spaced-apart balance weight holes 956 formed through the axial thickness of second radial wall 917. The balance weight holes 956 may be threaded. One or more balance weights 970 having complementary threads may be screwed into the balance weight holes 956 to affect the balance of the flanged joint 50. The holes 956 are one example of a "balance weight receptacle".

Figure 26:
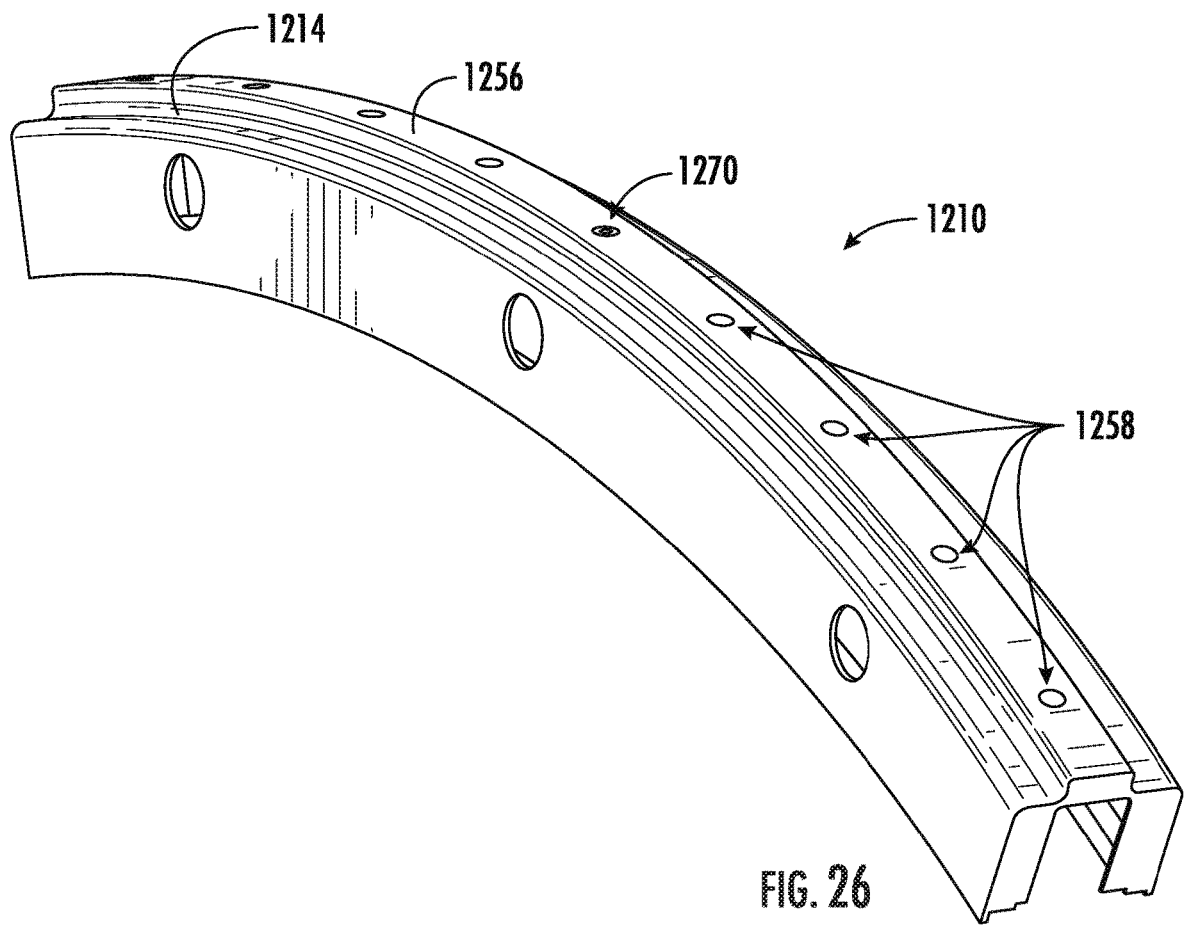
FIG. 26 is a perspective view of an exemplary fastener cover segment including an array of holes for receiving balance weights.
Figure 27:
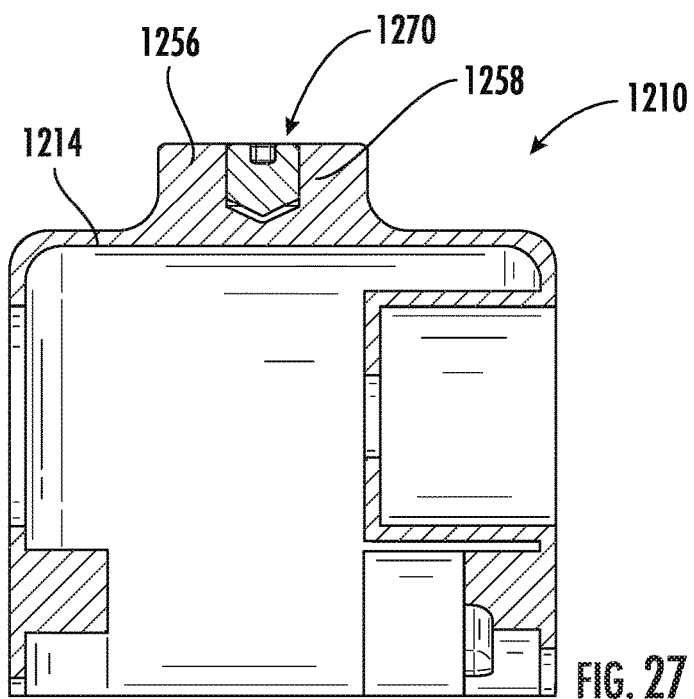
FIG. 27 is a cross-sectional view of a portion of the fastener cover segment of FIG. 26.

Yet another configuration for mounting one or more balance weights is shown in FIGS. 26 and 27. A fastener cover segment 1210, most similar to fastener cover segments 210 or 410 described above, but representative of any of the fastener cover embodiments previously described, is provided with an arcuate rib 1256 extending radially from an axial wall 1214 thereof. An array of spaced-apart balance weight holes 1258 are formed in the arcuate rib 1256. The balance weight holes 1258 may be threaded. One or more balance weights 1270 having complementary threads may be screwed into the balance weight holes 1258 to affect the balance of the flanged joint 50. The holes 1258 are another example of a "balance weight receptacle". As an alternative, which is not separately illustrated, the balance weight holes 1258 could be merged into an arcuate slot, similar in structure and function to the slot 858 described above, but formed in the radial wall 1214.

Another possible additional function is the provision of a sealing element.

Figure 24:
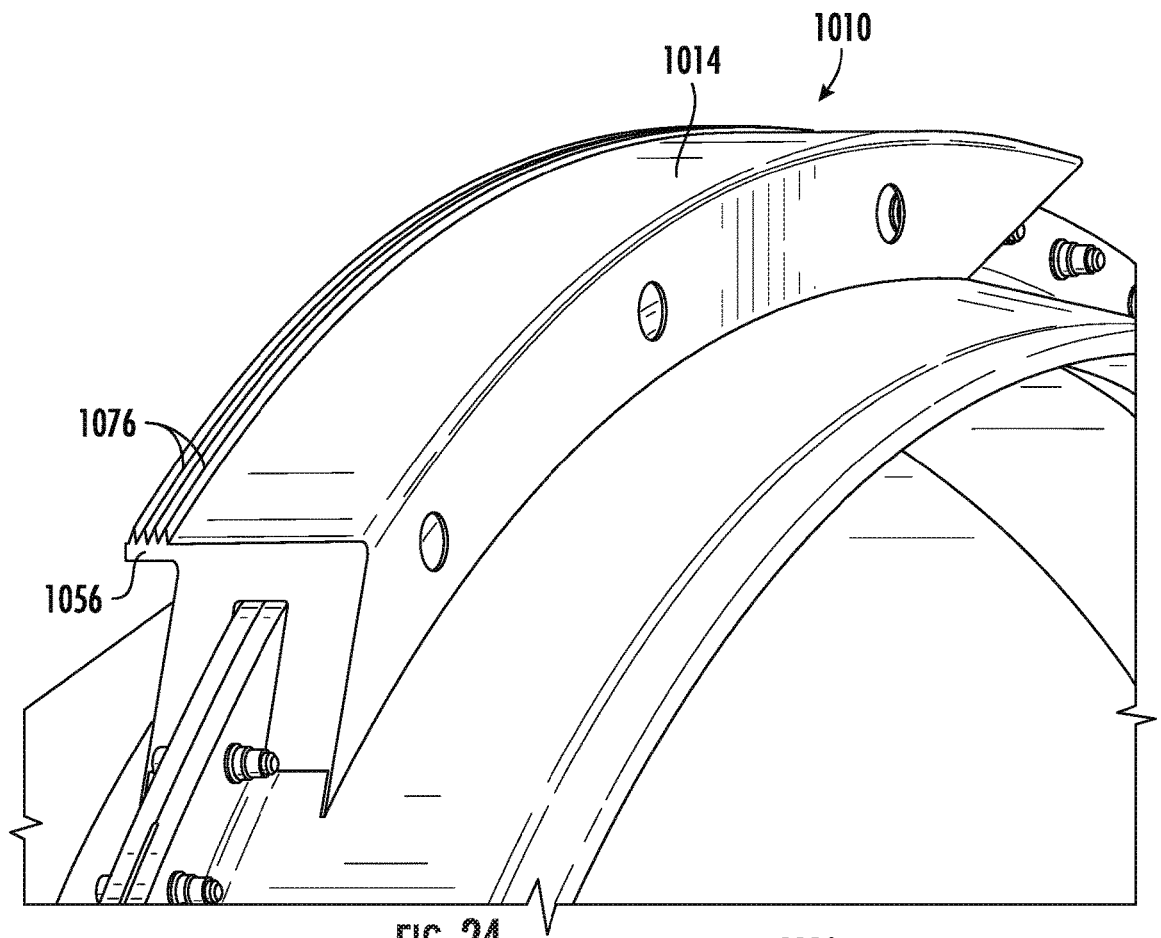
FIG. 24 is a perspective view of an exemplary fastener cover segment including a first variation of a labyrinth seal.

One configuration of a sealing element is shown in FIG. 24. A fastener cover segment 1010, most similar to fastener cover segments 310 or 510 described above, but representative of any of the fastener cover embodiments previously described, is provided with an arcuate seal flange 1056 extending axially outward from the outboard wall 1014. A row of side-by-side seal teeth 1076 extend radially outward from the seal flange 1056. When assembled in the engine 10, the seal teeth 1076 lie in close radial proximity to an annular stationary seal element, such as honeycomb or abradable material, not shown, and provide a tortuous flow path for leakage flow.

Figure 25:
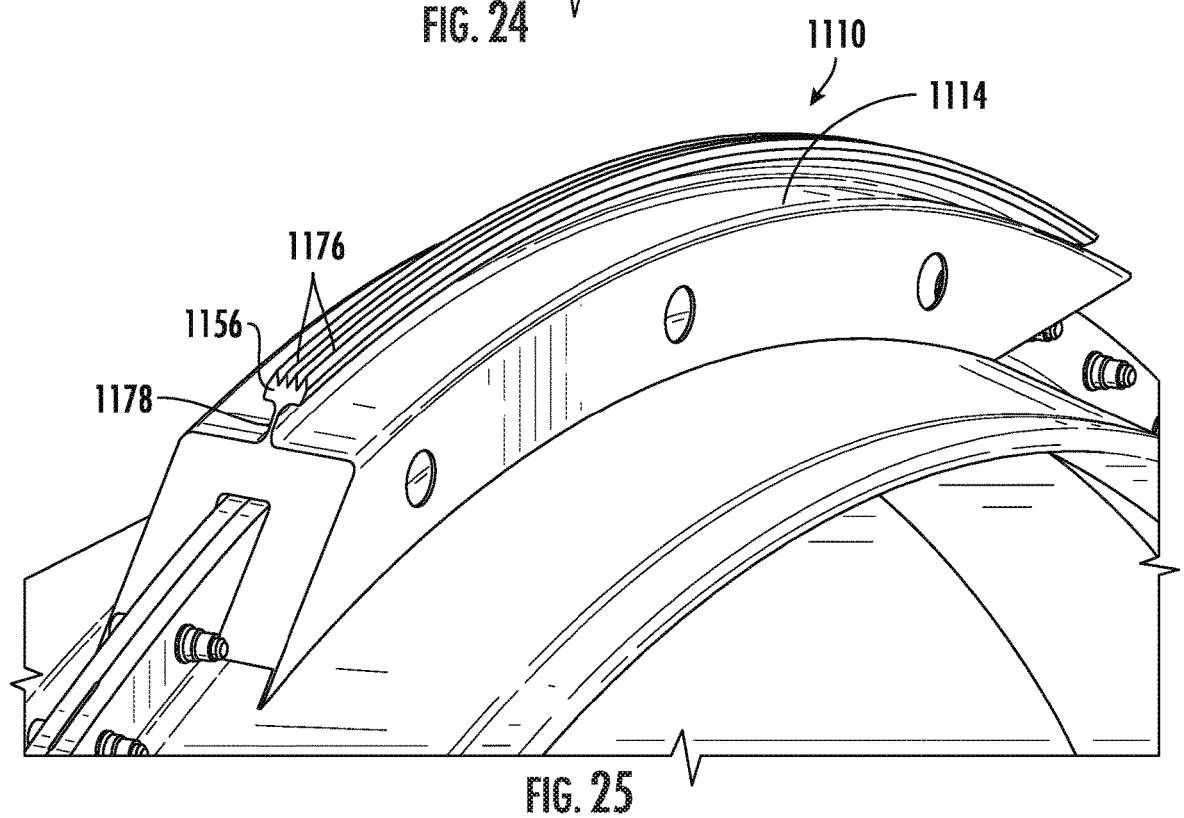
FIG. 25 is a perspective view of an exemplary fastener cover segment including a second variation of a labyrinth seal.

Another configuration of a sealing element is shown in FIG. 25. A fastener cover segment 1110, most similar to fastener cover segments 310 or 510 described above, but representative of any of the fastener cover embodiments previously described, is provided with an arcuate seal web 1178 extending radially outward from the outboard wall 1114. An arcuate seal flange 1156 is disposed at a distal end of the seal web 1178, forming a T-shape in cooperation with the seal web 1178. A row of side-by-side seal teeth 1176 extend radially outward from the seal flange 1156. When assembled in the engine 10, the seal teeth 1076 lie in close radial proximity to an annular stationary seal element, such as honeycomb or abradable material, not show, and provide a tortuous flow path for leakage flow.

The apparatus described herein has advantages over the prior art. For example, it can provide reduction in windage losses. Frictional contact between cover segments can damp vibration of the flanged joint. It can also provide rotor balance correction capability directly on the cover. This feature enables the balance weight application without the need to disassemble the cover from the flange or removing flange bolts. The cover can also include a sealing feature. Providing the cover as a separate 360 degree component eliminates risks of crack propagation into main structural rotor component (i.e. bolted flange). Finally, the segmented embodiment has no hoop stress and reduces the risk of crack propagation in the labyrinth seal. The foregoing has described a fastener cover. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Further aspects of the invention are provided by the subject matter of the following numbered clauses:

1. A fastener cover for a flanged joint including first and second annular flanges extending about an axis, comprising: an annular, axially-extending, inboard wall; an annular, axially-extending outboard wall positioned radially outboard of the inboard wall; and a first radial wall interconnecting the inboard and outboard walls, wherein, collectively, the inboard and outboard walls and the first radial wall define a cavity for receiving a portion of a fastener protruding from one of the flanges; at least one fastener pocket including sidewalls extending axially away from the first radial wall and defining a tubular shape, which is closed off opposite the first radial wall by a floor plate having a clearance hole passing therethrough for accepting a shank of the fastener; and wherein the cover includes a balance weight receptacle for accepting at least one balance weight.

2. The fastener cover of any preceding clause wherein: the balance weight receptacle includes an arcuate slot formed through the first radial wall, the slot including a narrow portion adjacent a rebate; the narrow portion of the slot receives a threaded shank of a T-bolt; a head of the T-bolt is received in the rebate and interfaces with the rebate so as to prevent rotation of the T-bolt; and a locking nut is threaded onto the shank of the T-bolt so as to clamp the T-bolt in position within the slot.

3. The fastener cover of any preceding clause wherein one or more balance weights are placed over the shank of the T-bolt, and secured with a retention nut.

4. The fastener cover of any preceding clause wherein the balance receptacle includes: weight holes formed in the first radial wall.

5. The fastener cover of any preceding clause further including an arcuate seal flange and at least one arcuate seal tooth extending radially outward from the seal flange.

6. The fastener cover of any preceding clause wherein the seal flange extends axially from the outboard wall.

7. The fastener cover of any preceding clause wherein an arcuate seal web extends radially outward from the outboard wall, and the seal flange is disposed at a distal end of the seal web, forming a T-shape in cooperation with the seal web.

8. The fastener cover of any preceding clause, wherein the fastener cover comprises a plurality of arcuate fastener cover segments arrayed about the axis to form a 360° annulus, each fastener cover segment extending between first and second circumferential ends.

9. The fastener cover of any preceding clause wherein first and second end edges are located at the first and second circumferential ends, respectively, and the end edges are oriented in a radial direction.

10. The fastener cover of any preceding clause wherein first and second end edges are located at the first and second circumferential ends, respectively, and the end edges are oriented in a direction oblique to the radial direction.

11. The fastener cover of any preceding clause wherein each circumferential end includes at least one end wall.

12. The fastener cover of any preceding clause wherein the at least one end wall is oriented in a radial direction.

13. The fastener cover of any preceding clause wherein the at least one end wall is oriented in a direction oblique to the radial direction.

14. A fastener cover for a flanged joint including first and second annular flanges extending about an axis, comprising: a plurality of arcuate fastener cover segments arrayed about the axis to form a 360 degree annulus, each fastener cover segment extending between first and second circumferential ends and including: a first radial wall, a second radial wall axially spaced-apart from the first radial wall, an arcuate, axially-extending outboard wall interconnecting the first and second radial walls, wherein, collectively, the first and second radial walls and the outboard wall define a cavity for receiving the first and second flanges and portions of fasteners which protrude from the flanges; and an attachment structure spaced away from the first radial wall and including a clearance hole for a fastener shank.

15. The fastener cover of any preceding clause wherein the attachment structure comprises at least one fastener pocket, including sidewalls extending axially from the first radial wall and defining a tubular shape which is closed off by a floor plate, wherein the clearance hole passes through the floor plate.

16. The fastener cover of any preceding clause wherein the attachment structure comprises at least one mounting tab extending radially inward from the outboard wall, wherein the clearance hole passes through the mounting tab.

17. The fastener cover of any preceding clause wherein first and second end edges are located at the first and second circumferential ends, respectively, and the end edges are oriented in a radial direction.

18. The fastener cover of any preceding clause wherein first and second end edges are located at the first and second circumferential ends, respectively, and the end edges are oriented in a direction oblique to the radial direction.

19. The fastener cover of any preceding clause wherein each circumferential end includes a pair of end walls, the pair of end walls having a slot therebetween.

20. The fastener cover of any preceding clause wherein the pair of end walls are oriented in a radial direction.

21. The fastener cover of any preceding clause wherein each circumferential end includes an end wall interconnecting the first and second radial walls, the end wall having a slot therein.

22. The fastener cover of any preceding clause wherein each end wall is oriented in a direction oblique to the radial direction.

23. The fastener cover of any preceding clause wherein the cover includes a balance weight receptacle for accepting at least one balance weight.

24. The fastener cover of any preceding clause wherein: the balance weight receptacle includes an arcuate slot formed through one of the radial walls, the slot including a narrow portion adjacent a rebate; the narrow portion of the slot receives a threaded shank of a T-bolt; a head of the T-bolt is received in the rebate and interfaces with the rebate so as to prevent rotation of the T-bolt; and a locking nut is threaded onto the shank of the T-bolt so as to clamp the T-bolt in position within the slot.

25. The fastener cover of any preceding clause wherein one or more balance weights are placed over the shank of the T-bolt, and secured with a retention nut.

26. The fastener cover of any preceding clause wherein the balance weight receptacle includes weight holes formed in at least one of the radial walls.

27. The fastener cover of any preceding clause further including an arcuate seal flange and at least one arcuate seal tooth extending radially outward from the seal flange.

28. The fastener cover of any preceding clause wherein the seal flange extends axially from the outboard wall.

29. The fastener cover of any preceding clause wherein an arcuate seal web extends radially axially outward from the outboard wall, and the seal flange is disposed at a distal end of the seal web, forming a T-shape in cooperation with the seal web.

What is claimed is:

1. A fastener cover for a flanged joint including first and second annular flanges extending about an axis, comprising:
an annular, axially-extending, inboard wall; an annular, axially-extending outboard wall positioned radially outboard of the inboard wall; and a first radial wall interconnecting the inboard and outboard walls, wherein, collectively, the inboard and outboard walls, and the first radial define a cavity for receiving a portion of a fastener protruding from one of the flanges;
at least one fastener pocket including sidewalls extending axially away from the first radial wall and defining a tubular shape, which is closed off opposite the first radial wall by a floor plate having a clearance hole passing therethrough for accepting a shank of the fastener; and
wherein the fastener cover includes a balance weight receptacle for accepting at least one balance weight, the balance weight receptacle includes an arcuate slot formed through the first radial wall, the slot including a narrow portion adjacent a rebate.

2. The fastener cover of claim 1 wherein:
the narrow portion of the slot receives a threaded shank of a T-bolt;
a head of the T-bolt is received in the rebate and interfaces with the rebate so as to prevent rotation of the T-bolt; and
a locking nut is threaded onto the shank of the T-bolt so as to clamp the T-bolt in position within the slot.

3. The fastener cover of claim 2 wherein one or more balance weights are placed over the shank of the T-bolt, and secured with a retention nut.

4. The fastener cover of claim 1 further including an arcuate seal flange and at least one arcuate seal tooth extending radially outward from the seal flange.

5. The fastener cover of claim 1, wherein the fastener cover comprises a plurality of arcuate fastener cover segments arrayed about the axis to form a 360° annulus, each fastener cover segment extending between first and second circumferential ends.

6. The fastener cover of claim 5 wherein first and second end edges are located at the first and second circumferential ends, respectively, and the end edges are oriented in a direction oblique to the radial direction.

7. The fastener cover of claim 5 wherein each circumferential end includes at least one end wall, and the end walls of adjacent fastener cover segments abut each other.

8. A fastener cover for a flanged joint including first and second annular flanges extending about an axis, comprising:
a plurality of arcuate fastener cover segments arrayed about the axis to form a 360 degree annulus, each fastener cover segment extending between first and second circumferential ends and including:
a first radial wall, a second radial wall axially spaced-apart from the first radial wall, an arcuate, axially-extending outboard wall interconnecting the first and second radial walls, wherein, collectively, the first and second radial walls and the outboard wall define a cavity for receiving the first and second flanges and portions of fasteners which protrude from the flanges; and
an attachment structure spaced away from the first radial wall and including a clearance hole for a fastener shank, the attachment structure comprising at least one fastener pocket including sidewalls extending axially from the first radial wall and defining a tubular shape which is closed off by a floor plate, wherein the clearance hole passes through the floor plate.

9. The fastener cover of claim 8 wherein first and second end edges are located at the first and second circumferential ends, respectively, and the end edges are oriented in a direction oblique to the radial direction.

10. The fastener cover of claim 8 wherein each circumferential end includes a pair of end walls, the pair of end walls having a slot therebetween and the end walls of adjacent fastener cover segments abut each other.

11. The fastener cover of claim 8 wherein each circumferential end includes an end wall interconnecting the first and second radial walls, the end wall having a slot therein.

12. The fastener cover of claim 8 wherein each end wall is oriented in a direction oblique to the radial direction.

13. The fastener cover of claim 8 wherein the fastener cover includes a balance weight receptacle for accepting at least one balance weight.

14. The fastener cover of claim 13 wherein:
the balance weight receptacle includes an arcuate slot formed through one of the radial walls, the slot including a narrow portion adjacent a rebate;
the narrow portion of the slot receives a threaded shank of a T-bolt;
a head of the T-bolt is received in the rebate and interfaces with the rebate so as to prevent rotation of the T-bolt; and
a locking nut is threaded onto the shank of the T-bolt so as to clamp the T-bolt in position within the slot.

15. The fastener cover of claim 14 wherein one or more balance weights are placed over the shank of the T-bolt, and secured with a retention nut.

16. The fastener cover of claim 13 wherein the balance weight receptacle includes weight holes formed in at least one of the radial walls.

17. The fastener cover of claim 8 further including an arcuate seal flange and at least one arcuate seal tooth extending radially outward from the seal flange.

* * * * *